(12) United States Patent
Baxendale et al.

(10) Patent No.: US 12,479,415 B2
(45) Date of Patent: Nov. 25, 2025

(54) SYSTEMS AND METHODS FOR HYBRID TRANSMISSION CONTROL

(71) Applicant: Ford Global Technologies, LLC, Dearborn, MI (US)

(72) Inventors: Timothy Baxendale, Portales, NM (US); Sassan Farahmand, Canton, MI (US); Fazal U. Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 407 days.

(21) Appl. No.: 17/823,821

(22) Filed: Aug. 31, 2022

(65) Prior Publication Data

US 2024/0067157 A1    Feb. 29, 2024

(51) Int. Cl.
*B60W 20/15* (2016.01)
*B60W 10/06* (2006.01)
*B60W 10/08* (2006.01)

(52) U.S. Cl.
CPC ............ *B60W 20/15* (2016.01); *B60W 10/06* (2013.01); *B60W 10/08* (2013.01); *B60W 2510/081* (2013.01); *B60W 2510/083* (2013.01); *B60W 2710/083* (2013.01)

(58) Field of Classification Search
CPC ....... B60W 10/06; B60W 10/08; B60W 20/15
See application file for complete search history.

(56) References Cited

U.S. PATENT DOCUMENTS

| | | | | |
|---|---|---|---|---|
| 10,005,375 B2* | 6/2018 | Yamazaki | ............. | B60W 10/08 |
| 10,065,626 B2* | 9/2018 | Wang | ................... | B60W 10/08 |
| 10,071,653 B2 | 9/2018 | Meyer et al. | | |
| 10,196,995 B2 | 2/2019 | Pirjaberi et al. | | |
| 10,220,833 B2 | 3/2019 | Zhang et al. | | |
| 10,703,215 B2 | 7/2020 | Liang et al. | | |
| 2013/0080038 A1* | 3/2013 | Zhou | ..................... | B60W 20/00 |
| | | | | 701/113 |

* cited by examiner

*Primary Examiner* — Luke Huynh
(74) *Attorney, Agent, or Firm* — David Kelley; McCoy Russell LLP

(57) ABSTRACT

Methods and systems are provided for operating a powertrain of a vehicle. In one example, the powertrain may include a first torque source, a second torque source, and an automatic transmission. The powertrain may further include a first controller configured to control the first torque source and a second controller configured to control the second torque source. The second controller stores instructions in non-transitory memory that when executed cause the second controller to command the first controller to control a torque of the first torque source via a feedforward torque value of the second torque source calculated at the second controller which is adjusted based on a degree of difference between a proximity term and a difference between the torque of the first torque source and a first torque source limit, the first torque source limit calculated at the second controller.

20 Claims, 5 Drawing Sheets

SYSTEMS AND METHODS FOR HYBRID TRANSMISSION CONTROL

FIELD

The present description relates generally to methods and systems for control of a powertrain including a first torque source and a second torque source controlled by a first controller and second controller respectively.

BACKGROUND/SUMMARY

A hybrid vehicle may include a powertrain where torque may be delivered to wheels of the hybrid vehicle by either an internal combustion engine (engine) and/or an electric motor (e-motor). The powertrain may include a transmission such as a modular hybrid transmission (MHT). The MHT may be configured such that the engine is coupled to the e-motor via a disconnect clutch. The e-motor and the engine may be operated so as to reach a target speed (e.g., speed control) or so as to reach a target torque (e.g., torque control). A speed and/or torque of the e-motor and a speed and/or torque of the engine may be set by different controllers. In one example, the e-motor may be controlled by a hybrid powertrain control module (HPCM) while a powertrain control module (PCM) may be configured to control the powertrain system including sending commands to the HPCM.

When the e-motor is operated in speed control mode and the engine is operated in torque control mode, the PCM may contribute to setting a torque of the e-motor by sending a feedforward (FF) term to the HPCM. When the e-motor is coupled to the engine, a speed of the engine and speed of the e-motor may be substantially the same. Therefore, the feedforward term from the PCM may be equal in magnitude to the engine torque, but with a sign of the engine torque value flipped.

However, the inventors herein have recognized a problem with controlling the speed of the e-motor using the FF torque value. When the e-motor is decoupled from the engine, the FF term sent to the HPCM may be a combination of drag from the engine (e.g., disconnect clutch drag) and converter losses. The HPCM may include a feedback controller (e.g., proportional integral derivative (PID) controller) which may adjust the torque of the e-motor by adding or subtracting a torque adjustment amount from the FF torque value to more closely match the speeds of the engine and e-motor. The PID may use a speed error to calculate the torque adjustment amount. When the e-motor is coupled to the engine, the amount added or subtracted may include a correction for torque converter loss. During a changeover period, when the e-motor is going from coupled to decoupled, a situation may occur where the torque converter loss may be counted by both the PID controller of the HPCM and in the FF torque value received from the PCM, resulting in an undesirable increase in speed at an impeller of a torque converter coupled to the e-motor.

Attempts to reduce or eliminate the undesirable increase in speed may include logic changes in both the PCM and HPCM, in addition to modifying the PCM and HPCM, to allow additional messages to be communicated between the two. However, the inventors herein have recognized potential issues with such systems. As one example, a solution to double counting conversion losses may be demanded in a situation where logic changes cannot be made to the HPCM, or where it is desired that a solution be implemented quickly, and a turnaround time for modifications to the HPCM may be longer than a turnaround time for modifications to the PCM. Adding more messages between the PCM and the HPCM may also be problematic, due to complexities associated with adjusting a network communication database to add new data to existing messages or create new messages. Adjusting the network communication database may also demand an undesirably long turnaround time.

In one example, the issues described above may be addressed by a powertrain of a vehicle, comprising: a first torque source, a second torque source and an automatic transmission, a first controller configured to control the first torque source; a second controller storing instructions in non-transitory memory that, when executed, cause the second controller to command the first controller to control a torque of the first torque source via a feedforward torque value of the second torque source calculated at the second controller, the feedforward torque value of the second torque source adjusted based on a degree of difference between a proximity term and a difference between the torque of the first torque source and a first torque source torque limit, the first torque source torque limit calculated at the second controller.

In this way, an occurrence of a temporary speed increase due to double counting conversion losses may be reduced through an update to a controller of the powertrain (e.g., the PCM) without having to also make changes to a controller of the e-motor (e.g., the HPCM). By a combination of adding conversion losses to the feedforward term and adjusting the term based on the calculated torque threshold of the e-motor, operation of the e-motor beyond upper and/or lower bounds of the calculated torque threshold may be avoided. Avoiding the temporary speed increase by modifying the PCM and not the HPCM may be desired due to labor and time constraints associated with modifying the HPCM. Further, the PCM may continue to communicate a feedforward term to the HPCM and therefore the method may not demand exchange of additional messages between the HPCM and PCM.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
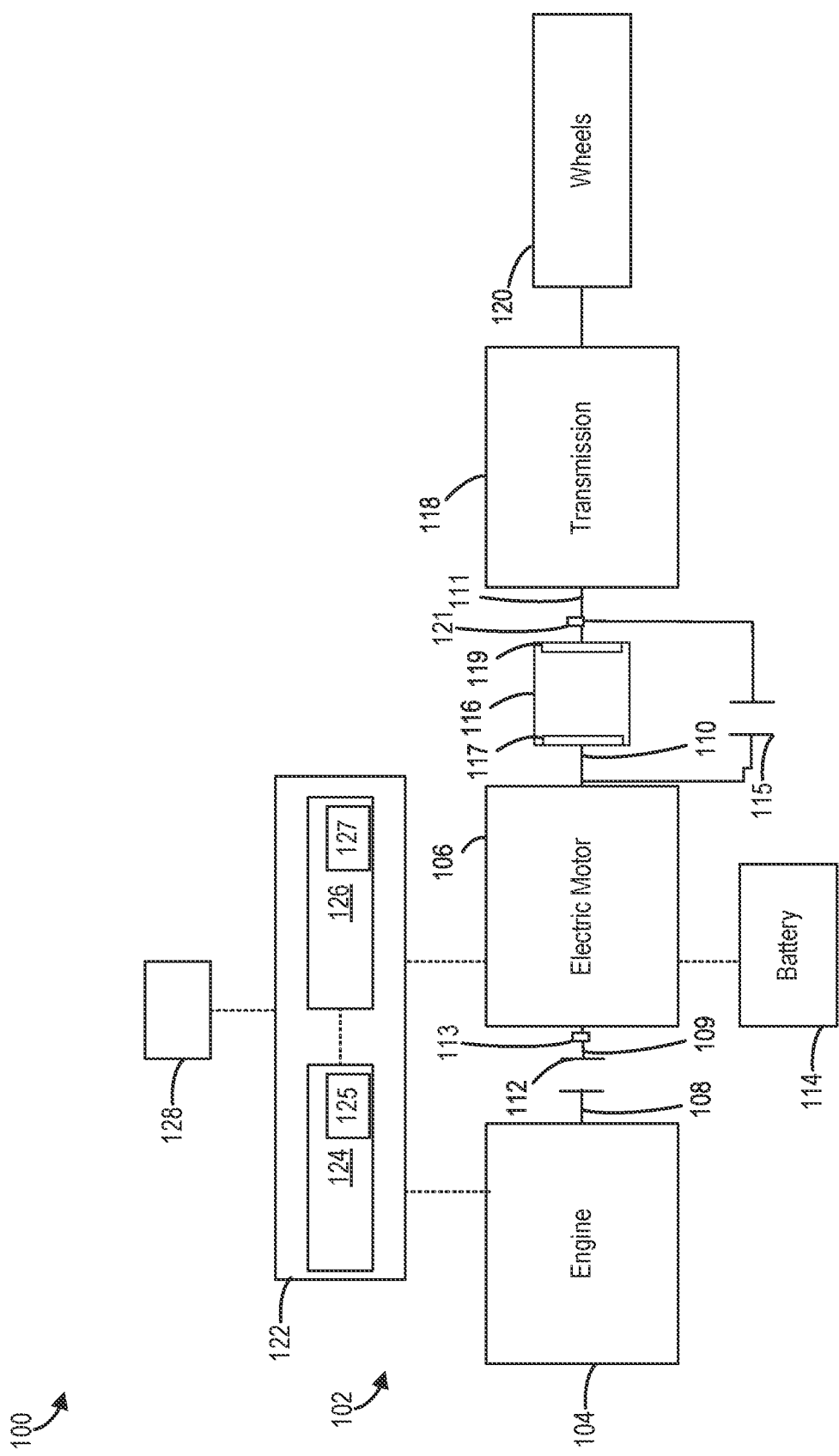
FIG. 1 shows a schematic diagram of a powertrain of a hybrid vehicle.
Figure 2:
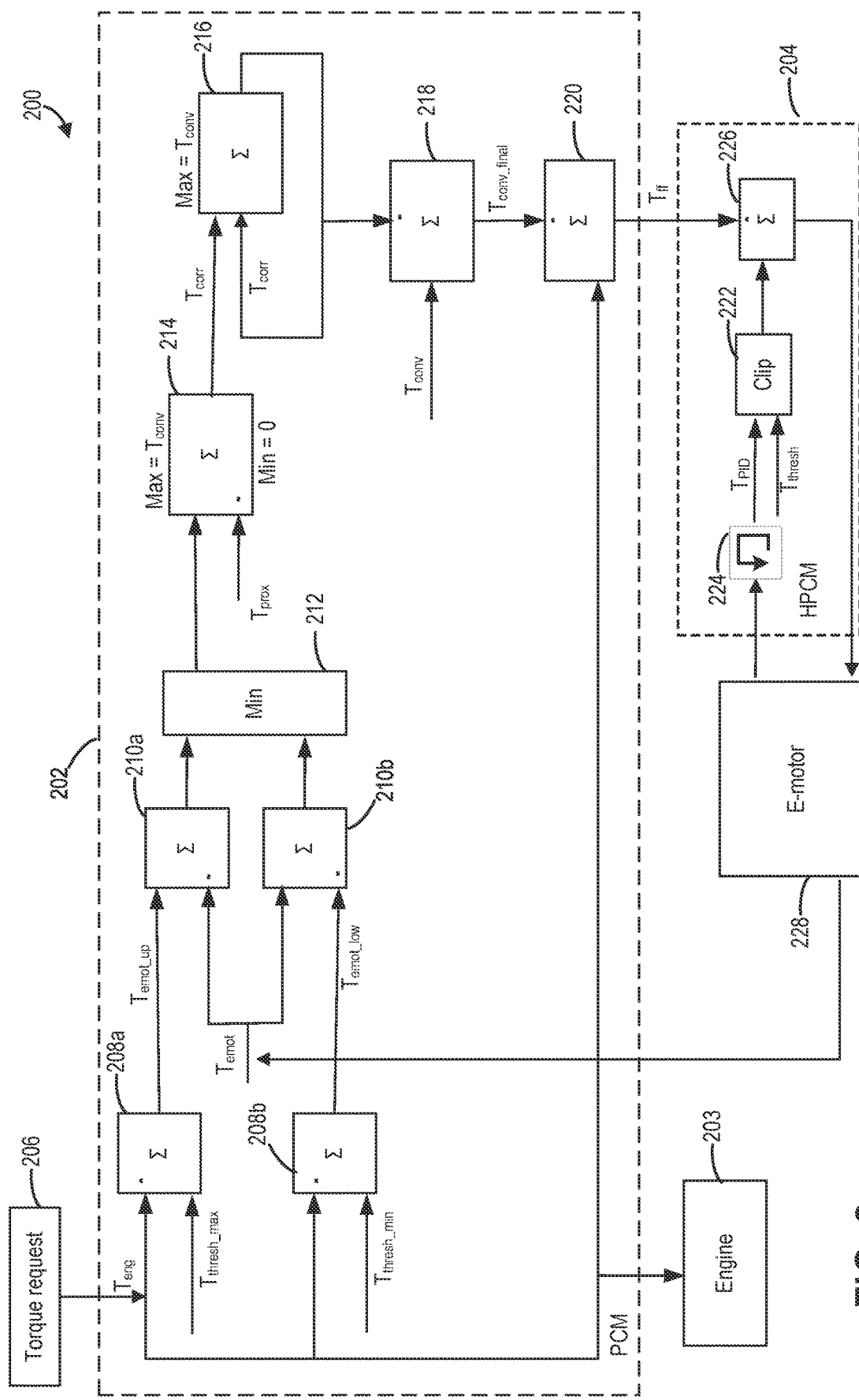
FIG. 2 shows a schematic diagram of a process for determining a feedforward term and setting an e-motor torque.
Figure 3:
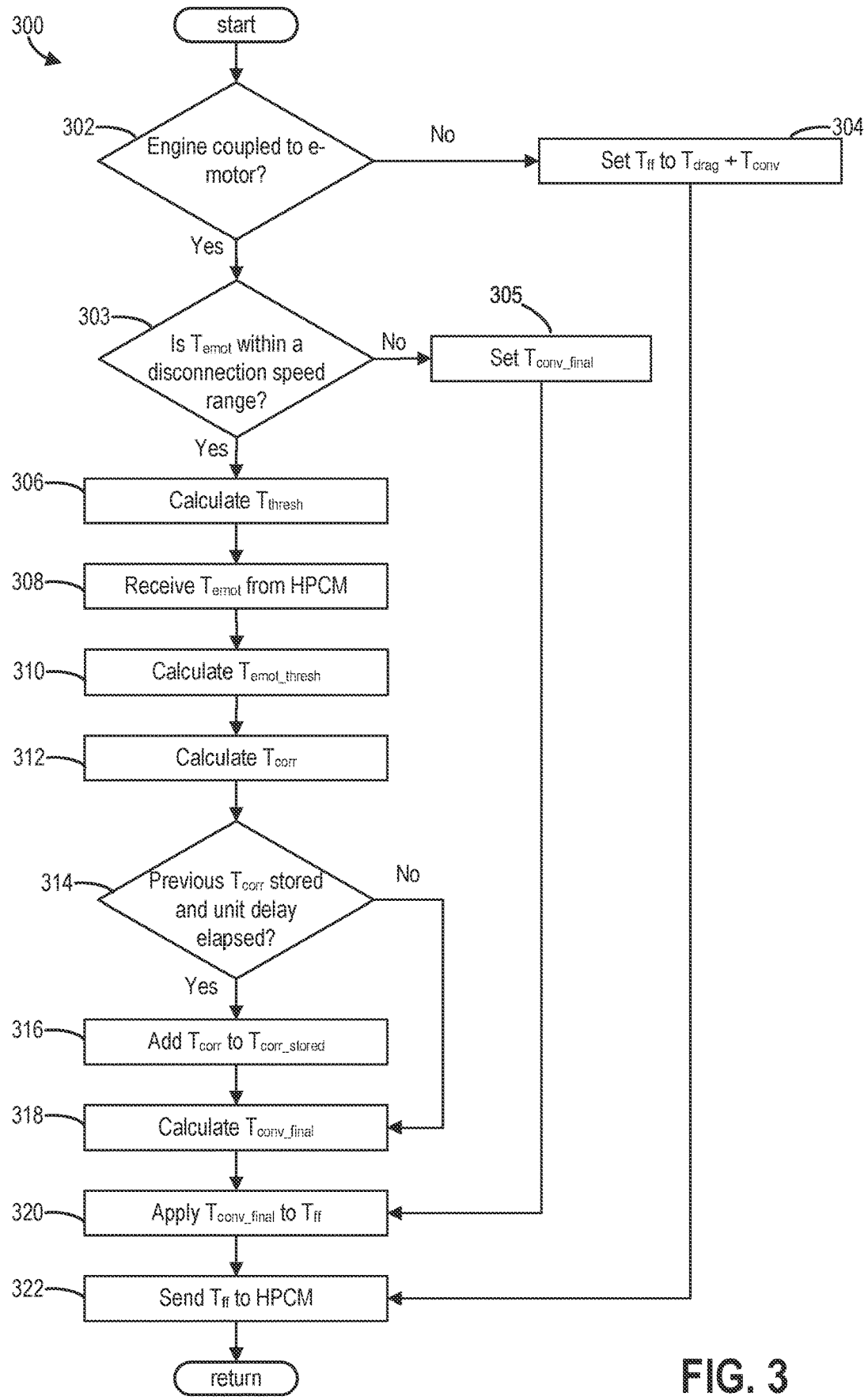
FIG. 3 shows an example of a method for calculating a feedforward term sent from a PCM to an HPCM.
Figure 4:
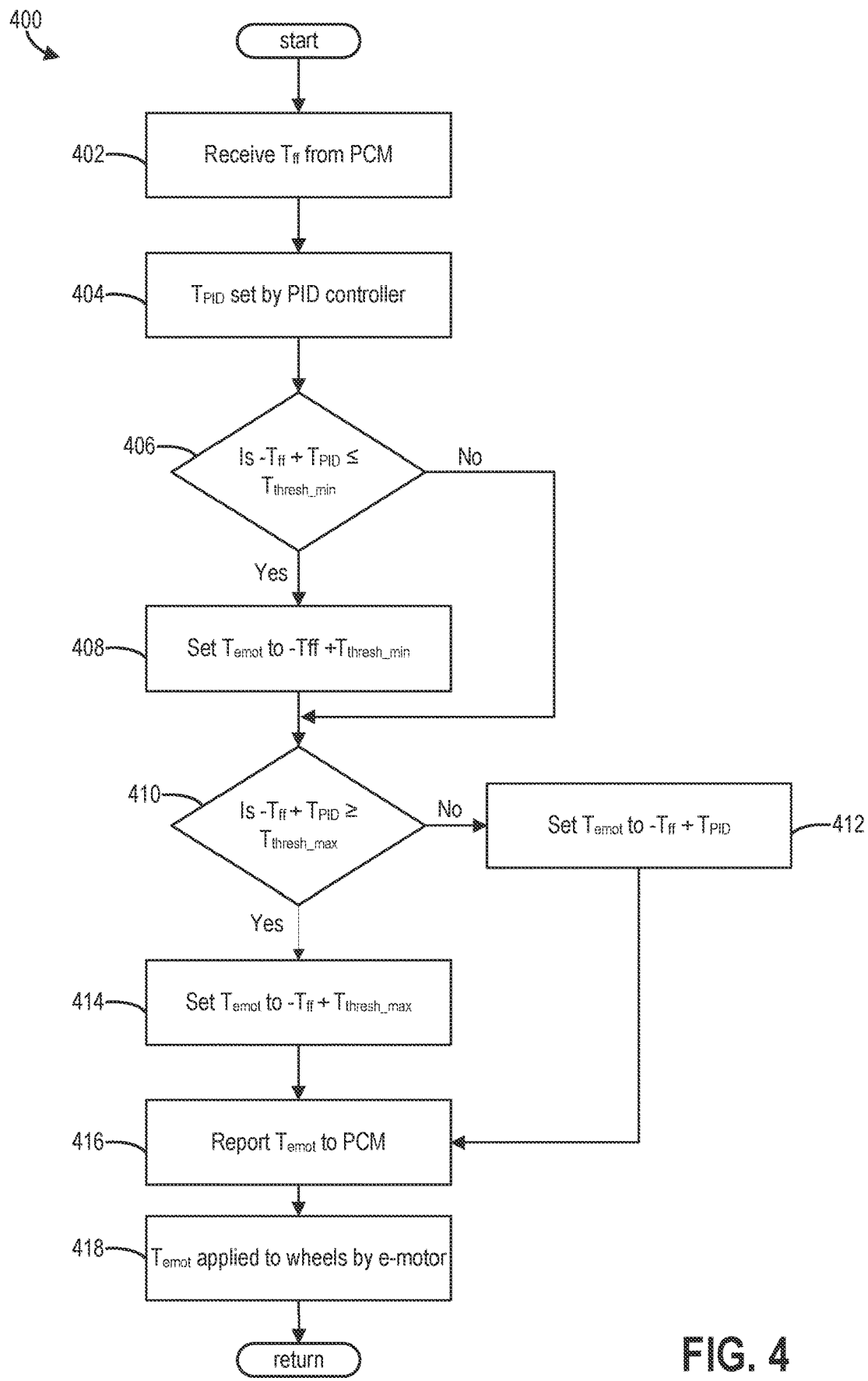
FIG. 4 shows an example of a method for setting e-motor torque by the HPCM.
Figure 5:
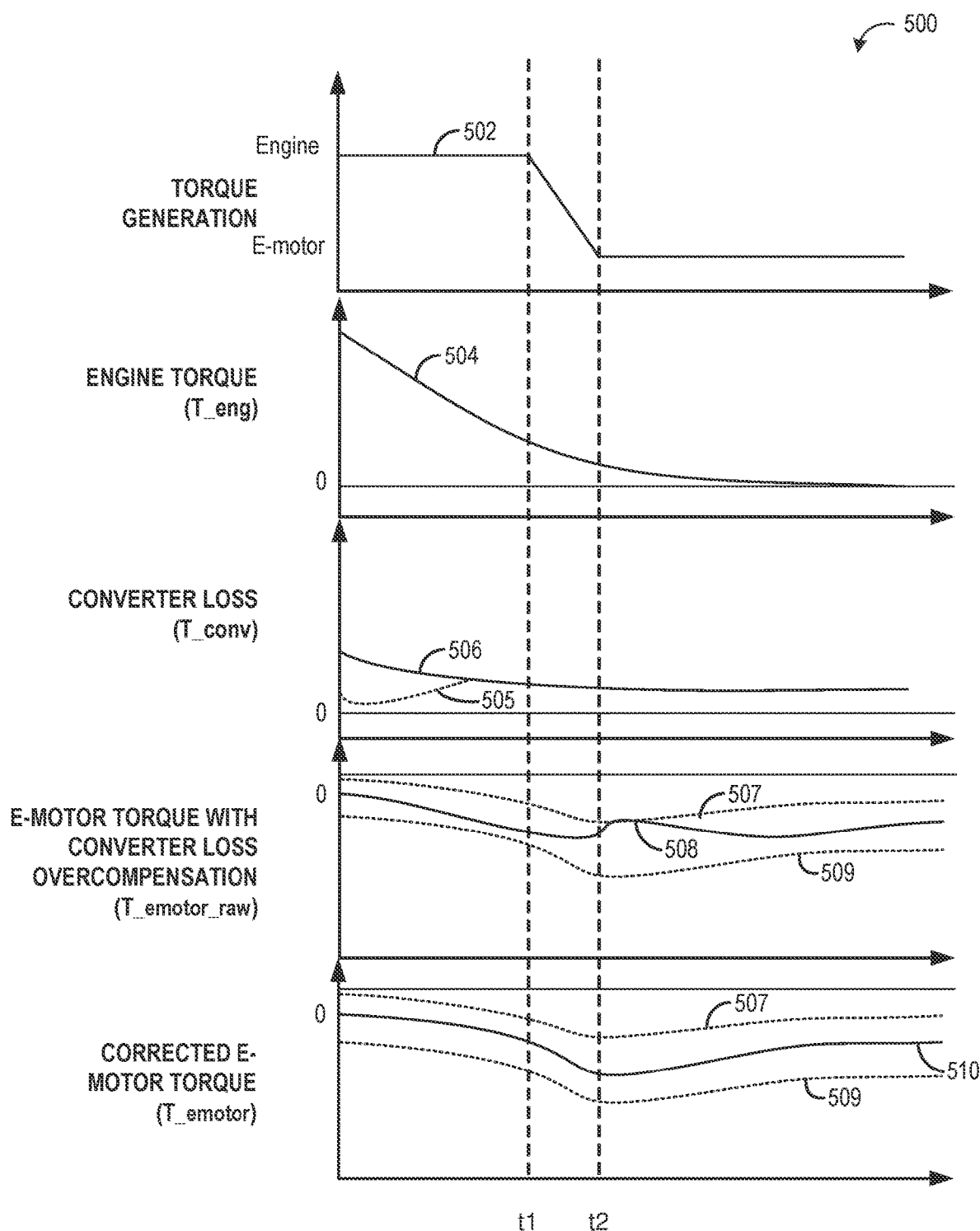
FIG. 5 shows an example timeline for operation of the vehicle of FIG. 1 according to the methods of FIGS. 3-4.

The following description relates to systems and methods for control of a powertrain including a first torque source and a second torque source. An example of a hybrid vehicle including a hybrid powertrain is shown in FIG. 1. As one example, the powertrain may include a modular hybrid transmission (MHT) of a hybrid vehicle and may include an electric motor as the first torque source and an engine as the second torque source. The first torque source may be controlled by a first controller in the form of a hybrid powertrain control module (HPCM) and the second torque source may be controlled by a second controller in the form of a powertrain control module (PCM). Other examples of powertrains and first/second torque sources (e.g., two electric motors or two engines) have been considered within a scope of this disclosure. When an engine of the hybrid vehicle is in torque control mode and the e-motor is in speed control mode, the PCM may send a feedforward term to the HPCM which the HPCM uses in addition to a torque adjustment generated by a PID controller to set a torque of the electric motor. A schematic diagram of calculations made at the PCM for adjusting the feedforward term to include a correction for torque conversion loss is shown in FIG. 2. A method for calculating the feedforward term at the PCM is shown in FIG. 3. A method for setting a torque of the e-motor based on the feedforward term sent by the PCM is shown in FIG. 4. FIG. 5 shows a timing diagram including engine torque and corrected e-motor torque for a vehicle operated according to the methods of FIGS. 3-4.

Referring now to FIG. 1, a diagram of a hybrid vehicle 100 is shown including a powertrain 102. Powertrain 102 may be configured as a MHT including a second torque source 104 coupled to a first torque source 106 via a disconnect clutch 112. In an embodiment, second torque source 104 may be an engine, referred to herein as an engine 104, and first torque source 106 may be an electric motor (e-motor), referred to herein as an e-motor 106. In one example, engine 104 may be an internal combustion engine configured to combust fuel such as gasoline, diesel and/or natural gas among others.

An engine shaft 108 of engine 104 may couple engine 104 to disconnect clutch 112. In some embodiments, a dual mass flywheel may be included in powertrain 102 between engine 104 and disconnect clutch 112 (not shown in FIG. 1). E-motor 106 may be configured as motor/generator including an input shaft 109 and output shaft 110. Input shaft 109 may couple to disconnect clutch 112. In one example, disconnect clutch 112 may be fully locked (e.g., engaged) when speeds of engine 104 and e-motor 106 are substantially the same and torque from the engine may supply power to wheels 120. In another example, disconnect clutch 112 may be disengaged and engine 104 may not supply power to wheels 120.

E-motor 106 may be operated to provide torque to powertrain 102 or to convert driveline torque into electrical energy to be stored in an electrical energy storage device 114. In some embodiments, e-motor 106 may directly drive powertrain 102 or be directly driven by powertrain 102, where there may be no belts, gears, or chains to couple e-motor 106 to powertrain 102. In other embodiments, e-motor 106 may be coupled to powertrain 102 via belts, gears or chains. Electrical energy storage device 114 may be a battery, capacitor, or inductor. When e-motor 106 may be operated as a generator (e.g., during regenerative braking), e-motor 106 may provide electrical power to charge electrical energy storage device 114. In some examples, vehicle 100 may be a plug-in hybrid vehicle and electrical energy storage device 114 may be charged by coupling to an external power source.

Output shaft 110 may be coupled to torque converter 116 which may be coupled to an input shaft 111 of an automatic transmission 118. Torque converter 116 includes a turbine 119 to output torque to transmission 118. Torque converter 116 also includes a torque converter bypass (e.g., lock-up) clutch 115. Torque is directly transferred from an impeller 117 to turbine 119 when bypass clutch 115 is locked. Alternatively, bypass clutch 115 may be hydraulically locked. Torque converter impeller speed and position may be determined via a sensor 113. Torque converter turbine speed and position may be determined via position sensor 121. In some examples, sensors 113 and/or 121 may be torque sensors or may be combination position and torque sensors.

When bypass clutch 115 is fully disengaged, torque converter 116 transmits engine torque to automatic transmission 118 via fluid transfer between the torque converter turbine 119 and torque converter impeller 117, thereby enabling torque multiplication. In contrast, when bypass clutch 115 is fully engaged, torque is directly transferred via bypass clutch 115 to transmission input shaft 111. Alternatively, the bypass clutch 115 may be partially engaged, thereby enabling the amount of torque directly relayed to transmission 118 to be adjusted. An output side of transmission 118 may be coupled to wheels 120 of hybrid vehicle 100.

Engine 104 and e-motor 106 may be communicatively coupled to a controller 122. Controller 122 may receive inputs from user controls 128. In one example, user controls 128 may include a gas pedal and/or a brake pedal. Controller 122 may be configured to receive inputs from engine 104, and accordingly control a torque output of engine 104 and/or e-motor 106, operation of torque converter 116, transmission 118, and/or other components of powertrain 102. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 122 may control the engine torque output by controlling a combination of fuel pulse width, fuel pulse timing, and air charge. In all cases, engine control may be performed on a cylinder-by-cylinder basis to control the engine torque output. Controller 122 may also control torque output and electrical energy production from e-motor 106 by adjusting current flowing to and from windings of e-motor 106 as is known in the art. Controller 122 may be configured to adjust the amount of torque transmitted by torque converter 116 by adjusting bypass clutch 115 in response to various engine operating conditions, or based on a driver-based engine operation request.

Controller 122 may include one or more sub-controllers configured to control separate components of vehicle 100. In one example, controller 122 may include a powertrain control module (PCM) 124 configured to control components of powertrain 102 such as engine 104, e-motor 106, and disconnect clutch 112, etc. Additionally, controller 122 may include a hybrid powertrain control module (HPCM) 126 configured to control e-motor 106. HPCM 126 may be communicatively coupled to PCM 124 and may relay instructions from PCM 124 to e-motor 106. For example, PCM 124 may send a feedforward torque value to HPCM 126, which may calculate an allowed torque for the e-motor based on the received feedforward torque value.

PCM 124 may include a PID controller 125, which may control an operation of engine 104. PID controller 125 may be a feedback controller. For example, PID controller 125 may operate engine 104 in a torque control mode, to meet or maintain a torque target, or in a speed control mode, to meet or maintain a speed target. Similarly, HPCM 126 may include a PID controller 127, which may be used to control e-motor 106 in a torque control mode or a speed control mode.

When PCM 124 controls engine 104 in a torque control mode, and HPCM controls e-motor 106 in a speed control mode, PCM 124 may send a feedforward (FF) value to HPCM 126 which may be equal to a value of the engine torque. The FF value may be used by PID controller 127 to adjust control of e-motor 106 in the speed control mode. PID controller 127 may control the speed of e-motor 106 such that the torque of e-motor 106 is maintained within an upper and lower bound of an allowed torque corresponding to the (sign-flipped) FF value, to meet a power demand while operating within allowable boundaries. PID controller 127 may adjust the torque of e-motor 106 to compensate for losses. For example, losses may be generated at torque converter 116 as a result of hydraulic transfer of power from impeller 117 to turbine 119. Further, the PID may adjust for other unmeasurable torque sources transferred to the e-motor.

When an engine and e-motor are coupled via a disconnect clutch as shown above in FIG. 1 and a controller, such as controller 122, controls the engine in a torque control mode and the e-motor in a speed control mode, a PCM may send a feedforward value. The feedforward value may equal a value of the engine torque. The HPCM may in turn flip a sign of the engine torque and bound the value by an upper and lower value to set an allowed torque range for the e-motor. The HPCM may adjust a value of the e-motor torque by adding or subtracting an additional value generated by the PID controller according to equation 1 below $$T_{emot} = -T_{ff} + \min(T_{PID}, T_{thresh\_min}) \quad (1)$$

$T_{emot}$ is the e-motor torque set by the HPCM, $T_{ff}$ is the feedforward torque value sent to the HPCM by the PCM which may be the same as the set torque of the engine, $T_{PID}$ is a learned value generated by the PID controller of the HPCM. In one example $T_{PID}$ may be a torque adjustment generated by the PID controller which may be applied to the feedforward torque. $T_{thresh\_min}$ may be a lower bound torque value corresponding to a threshold, minimum amount that $T_{emot}$ may be lower than $-T_{ff}$. According to equation 1, $T_{emot}$ may be set to $-T_{ff}$ plus $T_{PID}$ or plus $T_{thresh\_min}$, whichever is lower. Equation 1 may apply when $T_{PID}$ is negative. When $T_{PID}$ is positive, $T_{thresh\_min}$ may be replaced by $T_{thresh\_max}$. $T_{thresh\_max}$ may be an upper bound torque value corresponding to a threshold maximum amount that $T_{emot}$ may be greater than $-T_{ff}$. In one example $T_{Thresh\_max}$ may be equal in magnitude to $T_{thresh\_min}$. In other examples, $T_{thresh\_min}$ and $T_{thresh\_max}$ may be of different magnitudes. $T_{thresh\_min}$ and $T_{thresh\_max}$ may be collectively referred to as $T_{thresh}$. In some examples, $T_{thresh}$ may be a percentage of ($T_{eng}$ or $T_{ff}$).

In an embodiment where a first torque source is an e-motor controlled by an HPCM and the second torque source is an engine controlled by a PCM, the PID controller of the HPCM may contribute a compensation term for any torque not included in the feedforward term.

Conventionally, a calculable torque modifier value, such as torque converter loss (e.g., torque converter 116 of vehicle 100) may not be included in the feedforward term when the engine is coupled to the e-motor. However, when the e-motor is being decoupled from the engine, the $T_{ff}$ may change to a term which also includes the torque converter loss, resulting in double counting of the converter loss in the $T_{emot}$ until the PID adjusts the compensation term to not include the torque converter loss. The temporary double counting of the torque converter loss during the transition from engine coupled to decoupled may result in a speed spike at an impeller of the torque converter. Converter loss, unlike other variables for which the PID controller may provide a correction, may be calculated and thus may not demand a PID controller to learn the converter loss value. Instead, $T_{ff}$ may be calculated at the PCM to include the torque converter loss. In this way, an occurrence of the speed spike may be minimized without having to change calculations executed by the HPCM and/or add additional logic messages between the PCM and HPCM. Other examples of calculable torque modifier values (either losses or gains) have also been considered within a scope of this disclosure.

Adding torque converter loss to the $T_{ff}$ term at the PCM may demand updating the PCM and not the HPCM. However, a monitor of the HPCM may expect a sum of engine torque ($T_{eng}$) and $T_{emot}$ to be within the bounds set by $T_{thresh\_min}$ and $T_{thresh\_max}$. The monitor of the HPCM may be one or more modules (e.g., algorithms) for monitoring torque commands send to the e-motor and provides when the commanded torque is outside of operational boundaries (e.g., boundaries set by $T_{thresh}$). If $T_{ff}$ also includes adjustment for torque converter loss according to the equation 2 below, then calculating $T_{emot}$ as described by equation 1 above may result in $T_{emot}$ exceeding the bounds set by the monitor of the HPCM.

$$T_{FF} = T_{eng} - T_{conv} \quad (2)$$

To avoid tripping the monitor of the HPCM while modifying only calculations performed in the PCM and not the HPCM, an adjusted torque ($T_{conv\_final}$) converter loss may be added to $T_{ff}$ instead of $T_{conv}$ as shown in FIG. 2.

Turning now to FIG. 2, a control system 200 of an MHT of a hybrid vehicle is shown. Control system 200 operates within a controller of the MHT, where the controller includes a PCM 202 and an HPCM 204. The controller, PCM 202 and HPCM 204 may be non-limiting examples of controller 122, PCM 124, and HPCM 126 of FIG. 1. Control system 200 controls a speed of an e-motor 228 of the MHT in a speed control mode. In particular, FIG. 2 shows a flow of signals through control system 200, when the e-motor 228 is operated in a speed control mode and an engine 203 of the MHT is operated in torque control mode, where the signals are calculated at various blocks of control system 200. Control system 200 may take a torque request 206 as input for torque control of the engine, and may output an e-motor torque to e-motor 228 to control the speed of the e-motor based on the torque request.

The torque request may be a driver demand for torque received from one or more user controls (e.g., user controls 128), such as an accelerator, or the torque request may be received from the controller based on instructions executed in a processor of the controller in response to a driving condition. In one example, the MHT may be included in an autonomous vehicle and the driver may be a controller of the autonomous vehicle.

PCM 202 includes a tangible and non-transitory computer readable medium (memory) in which programming instructions for controlling the engine are stored. The engine 203 may be controlled in a speed mode, or a torque control mode. HPCM 204 includes a tangible and non-transitory computer readable medium (memory) in which programming instructions for controlling e-motor 228 are stored. E-motor 228 may be controlled in a speed control mode or a torque control mode.

As used herein, the term tangible computer readable medium is expressly defined to include various types of computer readable storage and to exclude merely propagating signals. Additionally or alternatively, the example methods and systems may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information).

The torque request input into PCM 202 may determine and engine torque ($T_{eng}$) which may be input as a sign flipped $T_{eng}$ along with $T_{thresh\_max}$ into summation block 208a to output an electric motor torque maximum that may be allowed by a monitor of the e-motor ($T_{emot\_up}$) as described in equation 3 below. Sign flipping herein refers to changing the sign of a value to opposite of the retrieved or calculated sign. For example, $T_{eng}$ as requested may be a positive value and a sign flipped $T_{eng}$ may be equal in magnitude but a negative value.

$$-T_{eng}+T_{thresh\_max}=T_{emot\_up} \qquad (3)$$

$T_{thresh\_max}$ may be an upper bound calculated by PCM 202 using calculations which match the calculations of $T_{thresh\_max}$ at HPCM 204. In this way, $T_{emot\_up}$ may be calculated by PCM 202 and be substantially the same as a maximum of e-motor torque that may be allowed by the monitor of HPCM 204. Similarly, $T_{thresh\_min}$ may correspond to a lower bound and may be input with sign flipped $T_{eng}$ into summation block 208b to output an electric motor torque minimum ($T_{emot\_low}$) which may be allowed by HPCM 204. $T_{emot\_up}$ and $T_{emot\_low}$ may also be considered an upper and lower torque limit of the electric motor, respectively.

PCM 202 may input $T_{emot\_up}$ and a sign flipped $T_{emot}$ into summation block 210a to output a value indicative of how close in value $T_{emot}$ is to the maximum value of $T_{emot}$ as allowed by the monitor of HPCM 204. $T_{emot}$ may be reported to PCM 202 by HPCM 204. Similarly, $T_{emot}$ may be input with a flipped $T_{emot\_low}$ into summation block 210b to output a value indicative of how close $T_{emot}$ is to the minimum value of $T_{emot}$. Signs of values input to summation blocks 210a and 210b may be flipped such that outputs of 210a and 210b are positive values.

The outputs of summation blocks 210a and 210b may compared at minimum function 212 to output a value corresponding to either the output of summation block 210a or summation block 210b, depending on which value is lower. In this way, minimum function 212 may determine if $T_{emot}$ is closer to an upper or lower threshold and may output a value corresponding to how close the value is to the closest threshold.

PCM 202 may input the minimum value as determined by minimum function 212 and a sign flipped $T_{prox}$ into summation block 214. Summation block 214 may output a sum of the inputs if the sum is greater than or equal to zero or less than or equal a torque converter loss ($T_{conv}$). $T_{conv}$ may be an unadjusted torque converter loss. Summation block 214 may output zero if the sum of the inputs is less than zero (e.g., a negative value). $T_{conv}$ may correspond to a predicted torque converter loss calculated by PCM 202. In one example, PCM 202 may calculate $T_{conv}$ from values included in a corresponding lookup table also stored on PCM 202. $T_{prox}$ may be a proximity term equal to a threshold stored on PCM 202 corresponding to an amount by which $T_{emot}$ may approach $T_{emot\_up}$ or $T_{emot\_low}$. Said another way, $T_{prox}$ may be an allowed proximity of $T_{emot}$ to $T_{emot\_up}$ or $T_{emot\_low}$. For example, if $T_{emot\_up}$ is equal to −90 Nm and $T_{prox}$ is equal to −2 Nm then $T_{emot}$ is within $T_{prox}$ when $T_{emot}$ is greater than −92 Nm. $T_{prox}$ may allow PCM 202 to adjust $T_{ff}$ before $T_{emot}$ surpasses $T_{emot\_up}$ or $T_{emot\_low}$.

An output of summation block 214 may be a torque correction factor. $T_{corr}$ may correspond to an amount by which $T_{emot}$ is within $T_{prox}$ and may be zero if $T_{emot}$ is not within $T_{prox}$ of the minimum or maximum of $T_{emot}$. Said another way, $T_{corr}$ may correspond to an amount by which calculated torque converter loss ($T_{conv}$) may be reduced to avoid exceeding a minimum or maximum torque of the e-motor set by the monitor of the HPCM (e.g., $T_{emot}$ up or $T_{emot\_low}$). For example, if $T_{emot}$ is reported to be 2 Nm higher than $T_{emot\_up}$ and $T_{prox}$ is −2 Nm then $T_{corr}$ would be 4 Nm.

PCM 202 may update $T_{corr}$ at summation block 216 by adding $T_{corr}$ to a previously stored value of $T_{corr}$ (e.g., a stored correction factor) to the value of $T_{corr}$ returned in the subsequent calculation. Summation block 216 may be executed with a unit delay to allow $T_{corr}$ to update before adding the previous stored $T_{corr}$ value. In one example the unit delay may be scaled to account for delays between when $T_{ff}$ is sent from PCM 202 to HPCM 204 and when the actualized an e-motor torque is fed back to the PCM (e.g., input to summation block 210a and summation block 210b). The updated value may also include a maximum limit equal to $T_{conv}$. A combination of summation block 214 and summation block 216 may be represented by equation 4 below. In this way, $T_{corr}$ is decreased as a torque adjustment generated by the HPCM approaches $T_{thresh}$ and may approach zero as a torque adjustment generated at the HPCM approaches zero.

$$T_{corr}=T_{corr}+[(T_{emot}-T_{emot\_lim})-T_{prox}] \qquad (4)$$

PCM 202 may input a sign flipped $T_{corr}$ and $T_{conv}$ into summation block 218 to output $T_{conv\_final}$. Because $T_{corr}$ may be bounded to between zero and $T_{conv}$, $T_{conv\_final}$ may therefore also be greater than or equal to zero and less than or equal to $T_{conv}$. When $T_{corr}$ is equal to zero, $T_{conv}$ may be considered to be unadjusted. A sign flipped $T_{conv\_final}$ and $T_{eng}$ may be input to summation block 220 by PCM 202. Summation block 220 may output $T_{ff}$ which may be the term sent to HPCM 204. In this way, PCM 202 applies an adjusted torque converter loss to the feedforward term.

HPCM 204 may include PID controller 224. When e-motor 228 is operating in speed control mode, PID controller 224 may output $T_{PID}$ which may be a torque adjustment value, adjusting engine torque up or down from the feedforward torque to meet a target torque of the e-motor according to actual torque or speed values output by sensors of e-motor 228. HPCM 204 may input $T_{PID}$ from PID controller 224 and $T_{thresh}$ (e.g., $T_{thresh\_min}$ and $T_{thresh\_max}$) to minimum clip function 222. Clip function 222 may output a value that is equal to $T_{PID}$ as limited by $T_{thresh}$. Said another way, if $T_{PID}$ surpasses $T_{thresh}$ in either a positive or negative direction, clip function 222 may output $T_{thresh}$ otherwise the output of clip function is equal to $T_{PID}$.

HPCM 204 may receive $T_{ff}$ from PCM 202 and input sign flipped $T_{ff}$ and the output of clip function 222 to summation block 226. The output of summation block 226 may be a desired torque of the e-motor ($T_{emot}$) which may be output by HPCM 204 and sent to e-motor 228 as an e-motor torque command.

Turning now to FIG. 3, a method 300 by which $T_{ff}$ may be calculated is shown. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. The controller storing method 300 may be a PCM such as PCM 124 of FIG. 1 and PCM 202 of FIG. 2. Method 300 may be executed by the PCM when a controller of a vehicle (such as vehicle 100 of FIG. 1) has commanded an engine to be in torque control mode and an e-motor to be in speed control mode.

At 302, method 300 includes determining if the engine is coupled to the e-motor. The engine may be coupled to the e-motor when a disconnect clutch (such as disconnect clutch 112 of FIG. 1) is engaged. A state of the clutch (e.g., connected or disconnected) may be determined by signals sent from a sensor of the vehicle such as sensor 113 of FIG. 1. If the engine is not coupled to the e-motor, method 300, at 304, sets a torque feedforward value ($T_{ff}$) to equal a sum of engine drag (e.g., drag from the disconnect clutch) torque losses ($T_{drag}$) and converter torque losses ($T_{conv}$). Method 300 proceeds to 322 to send $T_{ff}$ to an HPCM, such as HPCM 126 of FIG. 1 or HPCM 204 of FIG. 2. Method 300 returns.

If the engine is coupled to the e-motor, method 300 continues to 303 to determine if $T_{emot}$ is within a disconnection speed range. Speed of the e-motor may be determined by a sensor of the e-motor such as sensor 113 of FIG. 1. If $T_{emot}$ is not within a disconnection speed range, then an adjusted torque conversion loss ($T_{conv\_final}$) is set by the PCM at 305 without continuing with calculations for a torque correction factor as described further below. If $T_{emot}$ is above the disconnection speed range, $T_{emot}$ may not be in speed control mode. If $T_{emot}$ is below the disconnection speed range, $T_{conv\_final}$ may be set to a rate limited or an adjusted over time value between zero and an unadjusted torque conversion loss. Method 300 then proceeds to 320 to apply $T_{conv\_final}$ to $T_{ff}$.

If $T_{emot}$ is within a disconnection speed range, then $T_{thresh}$ is calculated at 306. $T_{thresh}$ may be the upper and lower bounds by which torque of the e-motor may differ from torque of the engine when the two are coupled (e.g., $T_{thresh\_min}$ and $T_{thresh\_max}$). In one example, $T_{thresh}$ may be calculated by matching instructions stored on both the PCM and a controller of the e-motor (e.g., HPCM). As one example, $T_{thresh}$ may be calculated based on the torque of the engine ($T_{eng}$).

At 306, method 300 includes receiving $T_{emot}$ from the controller of the e-motor. $T_{emot}$ may be the updated setting of the e-motor torque as sent to the PCM by the HPCM. At 310, method 300 includes calculating $T_{emot\_thresh}$. $T_{emot\_thresh}$ may include both maximum and minimum values of e-motor torque (e.g., $T_{emot\_up}$ and $T_{emot\_low}$) which may be allowed by a monitor of the e-motor included on the HPCM. $T_{emot\_lim}$ may be calculated by summing a sign flipped $T_{eng}$ and the respective $T_{thresh}$ values as described by summation block 208a of FIG. 2.

At 312, method 300 includes calculating $T_{corr}$. $T_{corr}$ may be a value corresponding to an amount by which $T_{emot}$ may exceed $T_{prox}$. $T_{prox}$ may be a value stored on the PCM and $T_{corr}$ may be calculated following equation 4 as described above with respect to FIG. 2. At 314, method 300 includes determining if a previous value $T_{corr}$ is stored on the controller and a unit delay has elapsed since $T_{corr}$ was calculated at 312. The previous $T_{corr}$ may be a value that was stored on the controller after a previous iteration of method 300. The unit delay may correspond to a delay time for a $T_{ff}$ command sent to the HPCM and for the PCM to receive an update (e.g., updated $T_{emot}$) from the HPCM. As one example, the unit delay may be 40 milliseconds. If there is no previous $T_{corr}$ stored and the unit delay has not elapsed, method 300 proceeds to 318 to calculate $T_{conv\_final}$. As one example, the previous $T_{corr}$ may not be stored if method 300 has not yet been executed for a first time. If there is a previous $T_{corr}$ and the unit delay has elapsed, then $T_{corr}$ is added to the stored correction factor (e.g., $T_{corr}$ stored) at 316. In this way, $T_{corr}$ may be updated each time the PCM receives an updated value of $T_{emot}$ from the HPCM.

At 318, method 300 includes calculating $T_{conv\_final}$. $T_{conv\_final}$ may correspond to torque converter loss (e.g., $T_{conv}$) adjusted so that when torque conversion losses are added to the $T_{ff}$, $T_{emot}$ stays within the bounds imposed by the monitor. $T_{conv\_final}$ may be calculated by summing a sign flipped $T_{corr}$ with $T_{-conv}$ as described by summation block 218 of FIG. 2. $T_{conv}$ may be calculated by the PCM.

At 320, method 300 includes applying $T_{conv\_final}$ to $T_{ff}$. Applying $T_{conv\_final}$ to $T_{ff}$ may include setting $T_{ff}$ to the difference between $T_{eng}$ and $T_{conv\_final}$ as described by summation block 220 of FIG. At 322, $T_{ff}$ is sent to the HPCM. Method 300 returns. In this way, $T_{ff}$ may be adjusted for torque converter loss before $T_{ff}$ is sent to the HPCM in such a way that $T_{emot}$ does not exceed limits set by the monitor of the HPCM.

Turning now to FIG. 4, a method 400 is shown by which an HPCM such as HPCM 126 of FIG. 1 may calculate $T_{emot}$ to be applied to wheels of a vehicle, such as vehicle 100 of FIG. 1, by an e-motor. Method 400 may be executed by the HPCM when the e-motor is in a speed control mode and an engine of the vehicle is in torque control mode. At 402, method 400 includes receiving $T_{ff}$ from a PCM such as PCM 124 of FIG. 1 $T_{ff}$ may correspond to the $T_{ff}$ adjusted for an effective $T_{conv}$ (e.g., $T_{conv\_final}$) as described above with respect to method 300 of FIG. 3.

At 404, method 400 includes setting $T_{PID}$ to a value determined by a PID controller of the HPCM. The PID controller may receive an input of the current e-motor torque and output a torque adjustment (e.g., $T_{PID}$) to be applied to the feedforward term in order for the e-motor torque to reach a target value. $T_{PID}$ may adjust a torque to be added or removed from the current e-motor torque so that the e-motor may reach a target speed. $T_{PID}$ may be used to account for random and/or unaccounted for variables which may cause the actual e-motor torque to be different than the set e-motor torque.

At 406, method 400 includes determining if a sign flipped $T_{ff}$ (e.g., $-T_{ff}$) is less than or equal to $T_{thresh\_min}$. $T_{thresh\_min}$ may be a lower bound by which $T_{emot}$ may differ from $-T_{eng}$ as described above. If $-T_{ff}+T_{PID}$ is not less than or equal to $T_{thresh\_min}$, method 400 proceeds to 410 to determine $-T_{ff}+T_{PID}$ greater than $T_{thresh\_max}$. If $-T_{ff}+T_{PID}$ is less than $T_{thresh\_min}$, then at 408, method 400 includes setting $T_{emot}$ to $-T_{ff}+T_{thresh\_min}$.

At 410, method 400 includes determining if $-T_{ff}+T_{PID}$ is greater than or equal to $T_{thresh\_max}$. If $-T_{ff}+T_{PID}$ is not greater than $T_{thresh\_max}$, method 400 proceeds to 412 and $T_{emot}$ is set to $-T_{ff}+T_{PID}$. Method 400 then continues to 416 to report $T_{emot}$ to the PCM. If $-T_{ff}+T_{PID}$ is greater than $T_{thresh\_max}$, method 400 proceeds to 414 to set $T_{emot}$ to $-T_{ff}+T_{thresh\_max}$. In this way, 406, 408, 410, 412, and 414 may clip $T_{PID}$ to be within $T_{thresh}$ and $T_{emot}$ is set as described by clip function 222 and summation block 226 of FIG. 2.

At 416, method 400 includes reporting $T_{emot}$ to a PCM of the vehicle such as PCM 124 of FIG. 1 or PCM 202 of FIG. 2. The $T_{emot}$ reported at 416 may correspond to the $T_{emot}$ received by the PCM as described at 308 of FIG. 3. At 418, $T_{emot}$ is applied to wheels of the vehicle by the e-motor. Method 400 returns. It will be appreciated that method 400 may correspond to a conventional method by which HPCM may set $T_{emot}$. The adjusted conversion losses ($T_{conv\_final}$) may be added to the $T_{ff}$ term as described by the block diagram of FIG. 2 and method 300 of FIG. 3 in such a way that $T_{emot}$ may stay within the bounds imposed by $T_{thresh}$.

FIG. 5 depicts an example timing diagram 500, showing an exemplary sequence of events during a disconnection of an engine from an MHT of a hybrid vehicle. Prior to and during the disconnection, an e-motor of the MHT is operated in a speed control mode to match the torque of the engine provided while the engine is still connected and subsequently supply torque to wheels of the vehicle. The MHT may include a powertrain such as powertrain 102 of FIG. 1, where the engine and e-motor may be non-limiting embodiments of engine 104 and e-motor 106. As described above in reference to FIGS. 2-4, to avoid a redundant compensation for power loss at a torque converter of the MHT, a torque of the e-motor may be adjusted based on an effective converter loss term ($T_{conv\_final}$). The effective converter loss term may be adjusted so that e-motor torque may stay within e-motor torque bounds based on the allowed thresholds, which may be calculated at a PCM (e.g., PCM 124) of the MHT and an HPCM (e.g., HPCM 126) of the MHT. A feedforward engine torque ($T_{ff}$) value as adjusted by a PID controller and clipped with the allowed thresholds may determine $T_{emotor}$ as described above with respect to FIGS. 2-4.

A horizontal (x-axis) of timing diagram 500 denotes time and the vertical markers t1 and t2 identify significant times in the sequence of events. Timing diagram 500 includes five plots. A vertical axis (y-axis) may show variation between two variables in some plots and may show increasing values in other plots as denoted by labels of the vertical axis of each plot. A first plot, line 502, shows a source of torque generated by the MHT, e.g., how much torque is generated at the engine and how much torque is generated at the e-motor. A second plot, line 504, shows an engine torque $T_{eng}$, as measured by a torque sensor (e.g., torque sensor 121 of FIG. 1). A third plot, line 506, shows a torque converter loss $T_{conv}$, which may be a function of $T_{eng}$. A dotted line 505 indicates $T_{conv\_final}$ as described above with respect to FIGS. 2-3. A fourth plot, line 508, shows a torque $T_{emot\_raw}$ generated by the e-motor, where $T_{emot\_raw}$ overcompensates for the torque converter loss as described above. In other words, line 508 shows an e-motor torque output according to a conventional determination of the e-motor torque setting, without applying the correction described herein. A dotted line 507 indicates an upper torque bound and a dotted line 509 indicates a lower torque bound, within which $T_{emot\_raw}$ may be maintained in accordance with operational standards. A fifth plot, line 510, shows an e-motor torque $T_{emot}$ that corrects the overcompensation of $T_{emot\_raw}$, as described above in reference to FIGS. 2A-3B.

Prior to time t1, the vehicle is propelled by torque generated at the engine during which $T_{eng}$ is decreasing. For example, the vehicle may be approaching a target velocity where a driver demand for torque decreases.

At time t1, the engine torque output decreases to a threshold torque level, the threshold torque level being a torque demand that can be met exclusively by the e-motor, and a controller of the MHT initiates a decoupling of the engine from the e-motor. The HPCM commands the e-motor to begin to generate torque to propel the vehicle (e.g., to maintain the vehicle at the target velocity). The torque $T_{emot\_raw}$ generated by the e-motor may be controlled, with the e-motor operating in the speed control mode, by a PID controller (e.g., PID controller 127). To match $T_{eng}$ when the engine and e-motor are coupled (e.g., before t1), a FF engine torque value $T_{ff}$ is sent from the PCM to the HPCM, to be input to the PID controller.

Upper and lower bounds of $T_{emot\_raw}$ indicated by dotted lines 507 and 509 are also generated by the HPCM. Conventionally, before t1, a torque converter loss term $T_{conv}$ may be adjusted for by the PID controller. Alternatively, in accordance with the methods of FIGS. 3-4. $T_{ff}$ may be calculated to include the torque converter loss at the PCM using $T_{conv\_final}$. Dotted line 505 shows one example of how $T_{conv\_final}$ may be adjusted over time. $T_{conv\_final}$ may calculated such that $T_{conv\_final}$ is constrained to be between 0 and $T_{conv}$. A torque adjustment may also be supplied by a PID controller of the HPCM to adjust the commanded e-motor torque to meet a target value. As $T_{PID}$ (not shown) increases, a value of $T_{conv\_final}$ may decrease but may not be less than zero. As $T_{PID}$ decreases, a value of $T_{conv\_final}$ may increase but not more than $T_{conv}$ final. In this way, $T_{conv}$ may be incorporated into $T_{ff}$ while maintaining $T_{emot}$ within the upper lower bounds indicated by lines 507 and 509.

Between time t1 and time t2, the engine continues to be decoupled from the e-motor. $T_{emot\_raw}$ continues to be generated based on $T_{ff}$, $T_{upper}$, and $T_{lower}$, and $T_{PID}$. At t2 the engine is decoupled from the e-motor. Line 508 shows $T_{emot}$ $r_{aw}$ prior to an adjustment of $T_{ff}$ based on $T_{conv}$, where for $T_{conv}$ may be included in both $T_{ff}$ (e.g., $T_{ff}=T_{drag}+T_{conv}$) and may also be included in the torque adjustment ($T_{PID}$) applied $T_{emot\_raw}$ to by the PID controller of the HPCM. Alternatively, line 510 shows a $T_{emot}$ that has been corrected to not overcompensate for the torque converter loss, where $T_{conv}$ is included in $T_{ff}$ before t1, between t1 and t2 and after t2. In this way, $T_{PID}$ accounts for unexpected errors and does not include $T_{conv}$.

The technical effect of adjusting the torque converter loss included in the feedforward term is that a torque conversion loss may be accounted for in a torque set point of the e-motor without causing a torque of the e-motor to surpass bounds imposed by a monitor of an HPCM. The torque converter loss may be adjusted in real-time by calculations performed by a PCM and without changing calculations performed by the HPCM. In this way, double counting of torque converter loss by the feedforward term and a PID of the HPCM may be avoided. Adjusting the torque converter loss by updating calculations of the PCM and not the HPCM may be preferred when cost and/or time constraints do not allow for modifying calculations of the HPCM or modifying messages sent between the PCM and HPCM.

The disclosure also provides support for a powertrain of a vehicle, comprising: a first torque source, a second torque source and an automatic transmission, a first controller configured to control the first torque source, a second controller storing instructions in non-transitory memory that, when executed, cause the second controller to command the first controller to control a torque of the first torque source via a feedforward torque value of the second torque source calculated at the second controller, the feedforward torque value of the second torque source adjusted based on a degree of difference between a proximity term and a difference between the torque of the first torque source and a first torque source torque limit, the first torque source torque limit calculated at the second controller. In a first example of the system, the feedforward torque value of the second torque source is adjusted by subtracting an adjusted calculable torque modifier value from the feedforward torque value of the second torque source, the adjusted calculable torque loss value adjusted based on a known calculable torque modifier value and a correction factor, the correction factor based on the proximity term. In a second example of the system, optionally including the first example, the known calculable torque modifier value is retrieved from a lookup table in a memory of the second controller, and wherein the adjusted calculable torque modifier value is greater than or equal to zero and less than or equal to the known calculable torque modifier value. In a third example of the system, optionally including one or both of the first and second examples, the first controller and the second controller include matching instructions for calculating a threshold torque, the threshold torque used to calculate the first torque source torque limit. In a fourth example of the system, optionally including one or more or each of the first through third examples, the feedforward torque value of the second torque source is adjusted when the second torque source is coupled to the first torque source and the feedforward torque value of the second torque source is not adjusted when the second torque source is decoupled from the first torque source. In a fifth example of the system, optionally including one or more or each of the first through fourth examples, the vehicle is a hybrid vehicle, first torque source is an electric motor, the second torque source is an engine, the first controller is an hybrid powertrain control module, the second controller is a powertrain control module.

The disclosure also provides support for a system for operating a hybrid vehicle comprising: an engine, an electric motor, a torque converter, and an automatic transmission configured as a modular hybrid transmission (MHT), a powertrain control module (PCM) storing instructions in non-transitory memory that, when executed, in response to a sum of a torque adjustment generated at a feedback controller of the electric motor of the MHT and a torque converter loss of the MHT not being within a first threshold torque of an upper or lower torque bound, send a feedforward term from the PCM of the hybrid vehicle to the feedback controller, the feedforward term determined based on a torque of the engine of the MHT and the torque converter loss, and in response to the sum of the torque adjustment and the torque converter loss being within the first threshold torque of the upper or lower torque bounds, reduce an amount of the torque converter loss applied to the feedforward term. In a first example of the system, the feedback controller is operated by a hybrid powertrain control module (HPCM) of the hybrid vehicle. In a second example of the system, optionally including the first example, a torque of the electric motor is maintained within an electric motor torque maximum and an electric motor torque minimum by the HPCM, the electric motor torque maximum, a sum of the of the electric motor torque and the upper torque bound, the electric motor torque minimum the torque of the electric motor minus the lower torque bound. In a third example of the system, optionally including one or both of the first and second examples, the torque of the electric motor is sent from the HPCM to the PCM, and the upper and lower torque bounds of the electric motor are calculated by the PCM. In a fourth example of the system, optionally including one or more or each of the first through third examples, the amount of torque converter loss applied by the PCM is reduced by a torque correction factor applied by the PCM. In a fifth example of the system, optionally including one or more or each of the first through fourth examples, the torque correction factor decreases when the torque adjustment approaches the upper and lower torque bounds of the electric motor. In a sixth example of the system, optionally including one or more or each of the first through fifth examples, in response to the torque or the electric motor being within the first threshold torque of a minimum or maximum electric motor torque, the torque correction factor is calculated based on an amount by which the torque of the electric motor is within the minimum or maximum electric motor torque.

In a seventh example of the system, optionally including one or more or each of the first through sixth examples, the torque correction factor is calculated and then stored in a memory of PCM as a stored correction factor, and wherein the stored correction factor is updated each time the torque correction factor is newly calculated. In a eighth example of the system, optionally including one or more or each of the first through seventh examples, the torque correction factor is updated by adding the torque correction factor to the updated stored correction factor after a unit delay, the unit delay equal to a time elapsed between the PCM sending the feedforward term to the feedback controller and the feedback controller sending an electric motor torque to the PCM. In a ninth example of the system, optionally including one or more or each of the first through eighth examples, in a first condition, where the sum of the torque adjustment and the torque converter loss is not within the first threshold torque of an upper bound torque value or lower bound torque value, the feedforward term includes an unadjusted torque converter loss, and in a second condition, where the sum of the torque adjustment and the torque converter loss is within the first threshold torque of either the upper bound torque value or the lower bound torque value, the feedforward term includes an adjusted torque converter loss based on a difference between the sum of the torque adjustment and the torque converter loss and the upper and lower torque bound values.

The disclosure also provides support for a method for controlling a torque of an electric motor of a modular hybrid transmission (MHT), the method comprising: calculating an upper torque limit and a lower torque limit of the electric motor at a first controller of the MHT, calculating a feedforward torque value at the first controller based on an engine torque and a torque converter loss, calculating a commanded torque of the electric motor based on the feedforward torque value at a second controller, sending the commanded torque from the second controller to the first controller, adjusting the torque converter loss according to a proximity of the commanded torque to the upper and lower torque limits of the electric motor, and for a subsequent calculation of the feedforward torque value, applying a torque correction to the feedforward torque value, the torque correction based on a torque adjustment made by the second controller. In a first example of the method, the torque correction approaches zero as the torque adjustment approaches zero. In a second example of the method, optionally including the first example, the torque converter loss is calculated at the first controller and not the second controller. In a third example of the method, optionally including one or both of the first and second examples, the torque converter loss is adjusted in response to a speed of the electric motor being within a disconnection speed range and in response to the speed the electric motor being outside the disconnection speed range, the torque converter loss is rate limited over time.

In another representation, the disclosure also provides support for a powertrain of a hybrid vehicle, comprising: an engine, an electric motor, a torque converter, and an automatic transmission configured as a modular hybrid transmission (MHT), a hybrid powertrain control module (HPCM), a powertrain control module (PCM) storing instructions in non-transitory memory that, when executed, cause the PCM to command the HPCM to control a torque of the electric motor via a feedforward engine torque value calculated at the PCM, the feedforward engine torque value adjusted based on a degree of difference between a proximity and a difference between an electric motor torque and an electric motor torque limit, the electric motor torque limit calculated at the PCM. In a first example of the system, the feedforward engine torque value is adjusted by subtracting an adjusted torque converter loss value from the feedforward engine torque value, the adjusted torque converter loss value adjusted based on a known torque converter loss and a correction factor, the correction factor based on the proximity. In a second example of the system, optionally including the first example, the known torque converter loss is retrieved from a lookup table in a memory of the PCM. In a third example of the system, optionally including one or both of the first and second examples, the adjusted torque converter loss is greater than or equal to zero and less than or equal to the known torque converter loss. In a fourth example of the system, optionally including one or more or each of the first through third examples, the HPCM and PCM include matching instructions for calculating a threshold torque, the threshold torque used to calculate the electric motor torque limit. In a fifth example of the system, optionally including one or more or each of the first through fourth examples, the feedforward engine torque value is adjusted when the engine is coupled to the electric motor and the feedforward engine torque value is not adjusted when the engine is decoupled from the electric motor.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A powertrain of a vehicle, comprising:
    a first torque source, a second torque source and an automatic transmission;
    a first controller configured to control the first torque source;
    a second controller storing instructions in non-transitory memory that, when executed, cause the second controller to command the first controller to control a torque of the first torque source via a feedforward torque value of the second torque source calculated at the second controller, the feedforward torque value of the second torque source adjusted based on a degree of difference between a proximity term and a difference between the torque of the first torque source and a first torque source torque limit, the first torque source torque limit calculated at the second controller.

2. The powertrain of claim 1, wherein the feedforward torque value of the second torque source is adjusted by subtracting an adjusted calculable torque modifier value from the feedforward torque value of the second torque source, the adjusted calculable torque loss value adjusted based on a known calculable torque modifier value and a correction factor, the correction factor based on the proximity term.

3. The powertrain of claim 2, wherein the known calculable torque modifier value is retrieved from a lookup table in a memory of the second controller, and wherein the adjusted calculable torque modifier value is greater than or equal to zero and less than or equal to the known calculable torque modifier value.

4. The powertrain of claim 1, wherein the first controller and the second controller include matching instructions for calculating a threshold torque, the threshold torque used to calculate the first torque source torque limit.

5. The powertrain of claim 1, wherein the feedforward torque value of the second torque source is adjusted when the second torque source is coupled to the first torque source and the feedforward torque value of the second torque source is not adjusted when the second torque source is decoupled from the first torque source.

6. The powertrain of claim 1, wherein the vehicle is a hybrid vehicle, first torque source is an electric motor, the second torque source is an engine, the first controller is a hybrid powertrain control module, and the second controller is a powertrain control module.

7. A system for operating a hybrid vehicle, comprising:
    an engine, an electric motor, a torque converter, and an automatic transmission configured as a modular hybrid transmission (MHT);
    a powertrain control module (PCM) storing instructions in non-transitory memory that, when executed;
    in response to a sum of a torque adjustment generated at a feedback controller of the electric motor of the MHT and a torque converter loss of the MHT not being within a first threshold torque of an upper or lower torque bound, send a feedforward term from the PCM of the hybrid vehicle to the feedback controller, the feedforward term determined based on a torque of the engine of the MHT and the torque converter loss; and in response to the sum of the torque adjustment and the torque converter loss being within the first threshold torque of the upper or lower torque bounds, reduce an amount of the torque converter loss applied to the feedforward term.

8. The system of claim 7, wherein the feedback controller is operated by a hybrid powertrain control module (HPCM) of the hybrid vehicle.

9. The system of claim 8, wherein a torque of the electric motor is maintained within an electric motor torque maximum and an electric motor torque minimum by the HPCM, the electric motor torque maximum, a sum of the electric motor torque and the upper torque bound, the electric motor torque minimum the torque of the electric motor minus the lower torque bound.

10. The system of claim 9, wherein the torque of the electric motor is sent from the HPCM to the PCM, and the upper and lower torque bounds of the electric motor are calculated by the PCM.

11. The system of claim 7, wherein the amount of torque converter loss applied by the PCM is reduced by a torque correction factor applied by the PCM.

12. The system of claim 11, wherein the torque correction factor decreases when the torque adjustment approaches the upper and lower torque bounds of the electric motor.

13. The system of claim 11, wherein in response to the torque or the electric motor being within the first threshold torque of a minimum or maximum electric motor torque, the torque correction factor is calculated based on an amount by which the torque of the electric motor is within the minimum or maximum electric motor torque.

14. The system of claim 11, wherein the torque correction factor is calculated and then stored in a memory of PCM as a stored correction factor, and wherein the stored correction factor is updated each time the torque correction factor is newly calculated.

15. The system of claim 14, wherein the torque correction factor is updated by adding the torque correction factor to the updated stored correction factor after a unit delay, the unit delay equal to a time elapsed between the PCM sending the feedforward term to the feedback controller and the feedback controller sending an electric motor torque to the PCM.

16. The system of claim 7, wherein in a first condition, where the sum of the torque adjustment and the torque converter loss is not within the first threshold torque of an upper bound torque value or lower bound torque value, the feedforward term includes an unadjusted torque converter loss; and in a second condition, where the sum of the torque adjustment and the torque converter loss is within the first threshold torque of either the upper bound torque value or the lower bound torque value, the feedforward term includes an adjusted torque converter loss based on a difference between the sum of the torque adjustment and the torque converter loss and the upper and lower torque bound values.

17. A method for controlling a torque of an electric motor of a modular hybrid transmission (MHT), the method comprising:

calculating an upper torque limit and a lower torque limit of the electric motor at a first controller of the MHT;

calculating a feedforward torque value at the first controller based on an engine torque and a torque converter loss, calculating a commanded torque of the electric motor based on the feedforward torque value at a second controller;

sending the commanded torque from the second controller to the first controller;

adjusting the torque converter loss according to a proximity of the commanded torque to the upper and lower torque limits of the electric motor; and for a subsequent calculation of the feedforward torque value, applying a torque correction to the feedforward torque value, the torque correction based on a torque adjustment made by the second controller.

18. The method of claim 17, wherein the torque correction approaches zero as the torque adjustment approaches zero.

19. The method of claim 17, wherein the torque converter loss is calculated at the first controller and not the second controller.

20. The method of claim 17, wherein the torque converter loss is adjusted in response to a speed of the electric motor being within a disconnection speed range and in response to the speed the electric motor being outside the disconnection speed range, the torque converter loss is rate limited over time.

* * * * *